US006088557A

United States Patent [19]

Janssen et al.

[11] Patent Number: 6,088,557

[45] Date of Patent: Jul. 11, 2000

[54] ELECTROSTATOGRAPHIC PRINTING APPARATUS WITH ENDLESS RECORDING BELT

[75] Inventors: Paul Frans Jan Janssen, Mortsel; Leo Norbert Maria Vackier, S'Gravenwezel; Luc Karel Maria Van Aken, Hasselt, all of Belgium

[73] Assignee: Xeikon NV, Mortsel, Belgium

[21] Appl. No.: 09/087,856

[22] Filed: Jun. 1, 1998

Related U.S. Application Data

[60] Provisional application No. 60/052,715, Jul. 16, 1997.

[30] Foreign Application Priority Data

Jun. 5, 1997 [EP] European Pat. Off. .............. 97201681

[51] Int. Cl.[7] ........................... G03G 15/00; F16C 32/06

[52] U.S. Cl. .......................... 399/165; 384/109; 384/115; 399/159; 399/162

[58] Field of Search .................................... 399/159, 162, 399/163, 164, 165, 167, 239, 278, 288, 303, 312, 313, 329, 352, 107, 116; 198/689.1, 811; 271/194, 195, 196, 197; 384/109, 115

[56] References Cited

U.S. PATENT DOCUMENTS

| | | | |
|---|---|---|---|
| 3,889,801 | 6/1975 | Boyer | 198/184 |
| 4,197,002 | 4/1980 | Hamaker et al. . | |
| 4,558,944 | 12/1985 | Bothner . | |
| 5,164,783 | 11/1992 | Taguchi et al. . | |
| 5,313,259 | 5/1994 | Smith . | |
| 5,330,341 | 7/1994 | Kemerer et al. | 425/144 |
| 5,337,123 | 8/1994 | Fisher . | |
| 5,598,255 | 1/1997 | De Cock et al. | 399/234 |

FOREIGN PATENT DOCUMENTS 57-64255 4/1982 Japan .

*Primary Examiner*—Matthew S. Smith
*Assistant Examiner*—Hoang Ngo
*Attorney, Agent, or Firm*—Larson & Taylor

[57] ABSTRACT

Electrostatographic printing apparatus with a recording member in the form of an endless belt (26), and an air bearing (50) for guiding such belt along an endless path, which air bearing includes two belt-supporting end sections (53, 54) with a certain circumferential size, arranged for producing supporting air cushions for supporting both marginal portions of the endless belt (26) while the belt (26) is angularly wrapped about the sections (53, 54), an intermediate section (59) located between such end sections (53, 54) for providing support for the belt (26) if a central portion thereof would tend to become displaced exaggeratedly inwardly of the bearing (50), and two air cushion relief sections (61, 62), each one located inwardly adjacent to a corresponding end section of the bearing (50), and having a circumferential size which is smaller than that of said end sections (53, 54).

11 Claims, 4 Drawing Sheets

ELECTROSTATOGRAPHIC PRINTING APPARATUS WITH ENDLESS RECORDING BELT

This application claims benefit of provisional application No. 60/052,715 filed Jul. 16, 1997.

FIELD OF THE INVENTION

The present invention relates to electrostatographic printing apparatus comprising air bearings for guiding a recording member in the form of an endless belt, along an endless path. The invention relates in particular to an electrophotographic colour printing machine.

BACKGROUND OF THE INVENTION

In an electrophotographic printing machine, a photoconductive member is charged to a substantially uniform potential to sensitize the surface thereof. The charged portion of the photoconductive member is image-wise exposed. Exposure of the charged photoconductive member selectively dissipates the charge thereon in the irradiated areas. As a result, an electrostatic latent image is recorded on the photoconductive member corresponding to the informational areas contained in the original document being reproduced. After the electrostatic latent image has been recorded on the photoconductive member, the latent image is developed by bringing toner into contact therewith. This forms a developed toner image on the photoconductive member which is subsequently transferred to a copy sheet. The copy sheet is heated to permanently affix the toner image thereto in image configuration.

Multicolour electrophotographic printing is substantially identical to black-and-white printing. However, rather than forming a single latent image on the photoconductive surface, successive latent images corresponding to different colours are recorded thereon. Each single colour electrostatic latent image is developed with toner of a colour complementary thereto. This process is repeated a plurality of cycles for differently coloured images and their respective complementarily coloured toner. Each single colour toner image is transferred to the copy sheet in superimposed registration with the prior toner image, thereby creating a multilayered toner image on the copy sheet. Thereafter, the multi-layered toner image is permanently fixed to the receptor sheet creating a colour copy or print. The developer material may be a liquid material or a powder material.

In order to successfully transfer different colour toner images to the copy sheet, the sheet can move in a path enabling successive different colour images to be transferred thereto. In this way the different colour toner images (e.g. magenta, cyan, yellow and black toner images) are transferred to the sheet.

One known technique for carrying out the described process comprises the use of an endless photoconductive belt onto which the distinct separation toner images are formed in succession, and from which these images are transferred in timed relation in coinciding relationship onto a receptor sheet to obtain a multilayered toner image.

The movement of suchlike endless photoconductive belt is a delicate point, since it must meet high standards of reproducibility and uniformity in order to obtain a desired image quality.

It is the aim of the present invention to provide an electrostatographic printing apparatus with a recording member in the form of an endless belt, such endless belt being guided along an endless path by air bearings providing an improved belt guidance.

SUMMARY OF THE INVENTION

In accordance with the present invention, an electrostatographic printing apparatus which comprises a recording member in the form of an endless belt, and at least one air bearing for guiding such belt along an endless path, is characterised thereby that such air bearing comprises two belt-supporting end sections with a certain circumferential size, arranged for producing supporting air cushions for supporting both marginal portions of said endless belt while the belt is angularly wrapped about them, an intermediate section located between such end sections for providing support for said belt if a central portion thereof would tend to become displaced exageratedly inwardly of the bearing, while yet remaining free of contact with the belt in normal operation of the bearing, and two air cushion relief sections, each one located inwardly adjacent to a corresponding end section of the bearing, and having a circumferential size which is smaller than that of said end sections.

It has been shown that the printing results as well as the lifetime of a recording member in the form of an endless belt in a printing apparatus according to the invention are superior to these of a recording member which is guided by guiding rollers only.

The mentioned intermediate section of an air bearing in a printing apparatus according to the invention may have a uniform axial cross section and a length which is at least equal to one third the length of the air bearing, but it may as well be composed of a plurality of axially spaced belt support sections. It should be understood that prevention of exaggerated inward bending of a central portion (i.e. towards the centre of the bearing) of the endless belt is important since such bending will cause lateral compression forces in the belt which may produce streaklike or foldlike (viz. lengthwise of the belt) damages of the surface of the belt, or/and of a photoconductive layer which has been coated thereon. Suchlike damages often do not (completely) disappear as the belt becomes straight again in the transverse direction.

Suitable embodiments of the invention are as follows.

The mentioned intermediate belt-supporting sections are arranged to produce belt-supporting air cushions.

The belt-supporting force produced by said intermediate belt supporting sections may be smaller than that produced by said end sections.

The air bearing sections producing an air cushion may have a circular cross section. However, if an electrostatographic printing apparatus according to the invention is arranged for transferring a toner image from the endless belt onto a receptor support at a locus where said endless belt is supported by a said air bearing, such receptor support following a linear path at such locus, it may desirable for said air bearing to have a cross section the curvature of which is greater at the place where such receptor support leaves contact with the endless belt than at the place where such support does not yet contact the endless belt. This may be interesting in case the endless belt is supported by air bearings of a relatively large diameter, say more than 70 mm, since electrostatic forces may prevent a spontaneous release of the sheet by the curved belt. Such locally increased curvature promotes the easy release of the receptor sheet from the belt.

However, a greater belt curvature causes a higher belt pressure towards its bearing whereby the risk may arise for the belt to contact the bearing. It is therefore interesting in such case to have a locally increased belt-supporting pressure and suchlike pressure may be suitably adjustable independently of the main pressure of the bearing. Therefore, the invention also contemplates an air bearing for an endless belt, the belt bearing pressure of which is variable angularly of the bearing.

The term "printing apparatus" stands in the first place for a printer which creates the output printing image by laying out the image in a series of horizontal scan lines, each line having a given number of pixels per inch. An exposure station for exposing the recording may comprise a laser with a rotating mirror block, a LED array, a uniform light source and a plurality of individually controllable light valves, an arrangement with deformable micromirror devices, etc. However, said term encompasses also an apparatus in which the exposure of the recording member occurs by the optical projection of an integral image, such as in a copier.

The term "recording member" refers in the first place to an endless belt which is made of, or comprises a layer of an organic or inorganic photoconductor which can be uniformly electrostatically charged and next image-wise discharged by appropriate integral or scanning-wise exposure. However, this term also encompasses an endless belt made of an organic film having no photoconductivity at all, and which is image-wise electrostatically charged by means of an ion radiation array. For that reason the term "electrostatographic" has been used in the statement of invention.

A suitable carrier for such member is a polyethylene terephthalate film in a thickness ranging from 50 to 300 $\mu$m.

The invention will now be further described, purely by way of example, with reference to the accompanying drawings, in which:

FIG. 1 is a diagrammatic view of one embodiment of a known duplex electrophotographic printer, FIG. 2 is an exploded view of one embodiment of an air bearing for use in the printer according to FIG. 1, FIG. 3 is an exploded view of another embodiment of an air bearing for use in the printer according to FIG. 1, FIG. 4 is an isometric view of still another embodiment of an air bearing for use in the printer according to FIG. 1, FIG. 5 is an isometric view of the primary feed pipe of the bearing of FIG. 4, FIG. 6 is an isometric detail view of one belt supporting section of the air bearing according to FIG. 4, FIG. 7 is a longitudinal sectional view of the bearing of FIG. 4, FIG. 8*a* is a cross-sectional view of the bearing of FIG. 4 on line VIII—VIII, the secondary feed pipe taking a first position, FIG. 8*b* is a cross-sectional view of the bearing of FIG. 4 on line VIII—VIII, the secondary feed pipe taking a second position, and FIG. 8*c* is a cross-sectional view of the bearing of FIG. 4 on line VIII—VIII, the secondary feed pipe taking a third position.

DETAILED DESCRIPTION OF THE INVENTION

Figure 1:
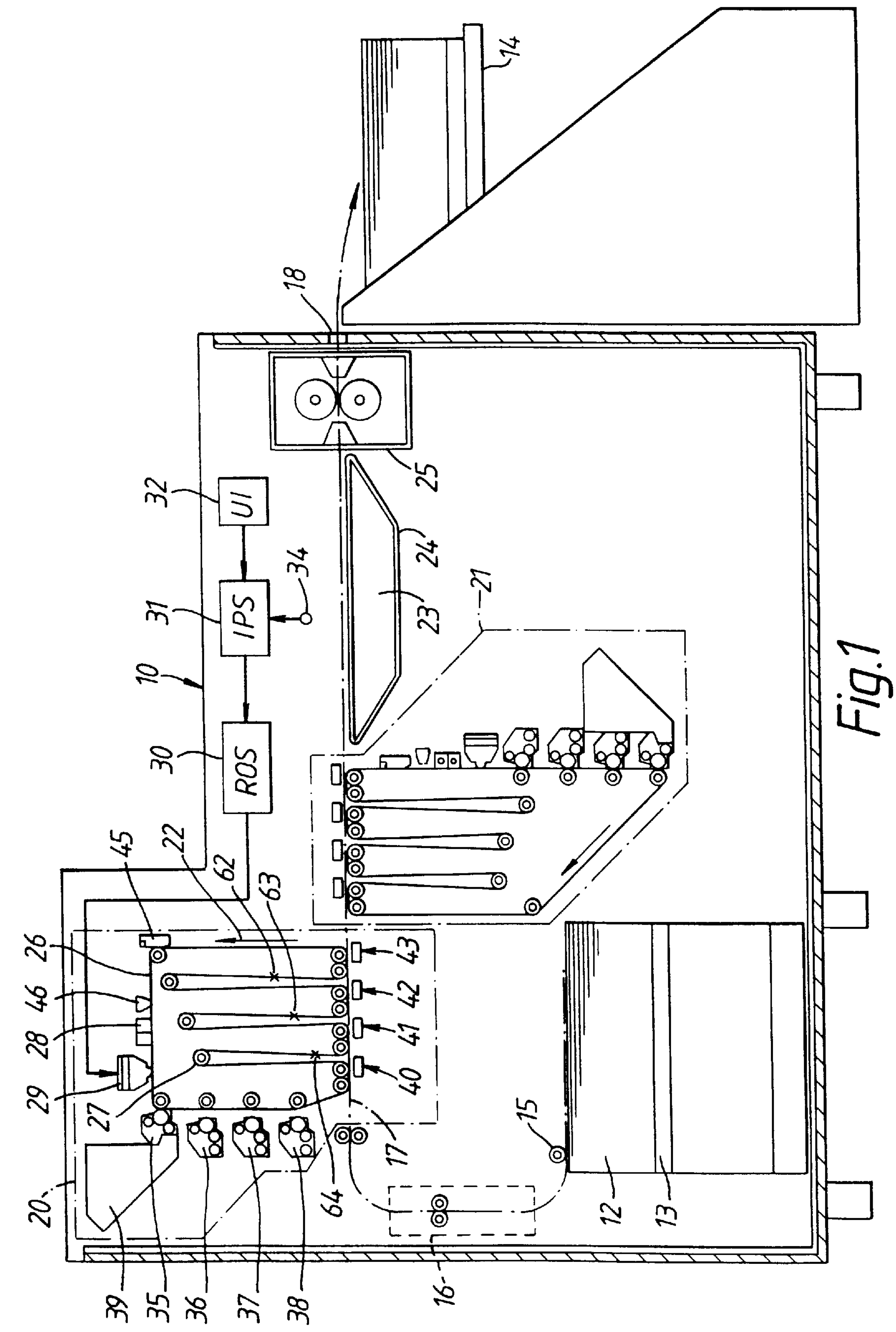

FIG. 1 shows a diagrammatic representation of one embodiment of an electrophotographic duplex printer.

The printer comprises a lighttight housing 10 which has at its inside a stack 12 of sheets to be printed loaded on a platform 13 the height of which is adjusted in accordance with the size of the stack, and at the outside a platform 14 onto which the printed sheets are received.

A sheet to be printed is removed from stack 12 by a dispensing mechanism 15 which may be any mechanism known in the art such as a friction roller, a friction pad, or the like for removing the top sheet from stack 12.

The removed sheet is passed through an alignment station 16 which ensures the longitudinal and lateral alignment of the sheet. As the sheet leaves the alignment station, it follows a straight horizontal path 17 up to outlet 18 of the printer.

The following processing stations are located along said path.

A first image forming station 20 for applying a colour image to the obverse side of the sheet and a second station 21 for applying a colour image to the reverse sheet side. A buffer station 23 with an endless belt 24 for transporting the sheet to fuser station 25 while allowing the speed of the sheet to decrease because the speed of fuser 25 is lower than the speed of image formation.

Both image forming stations 20 and 21 being equal to each other, only station 20 will be described in more detail hereinafter.

An endless photoconductor belt 26 is guided over a plurality of idler rollers 27 to follow a path in the direction of arrow 22 to advance successive portions of the photoconductive surface sequentially through the various processing stations disposed about the path of movement thereof. The belt suitably can be a polyethylene terephthalate support which is provided at the outside of its loop with a subbing layer onto which a photoconductive layer has been coated. Means is provided (not shown) for driving the belt at a uniform speed and for controlling its lateral position.

Initially, a portion of photoconductive belt 26 passes through charging station 28. At the charging station, a corona-generating device electrostatically charges the belt to a relatively high, substantially uniform potential. Next, the belt is rotated to the exposure station 29. The exposure station includes a ROS (raster output scanner) 30 with a laser with a rotating polygon mirror block which creates the output printing image by laying out the image in a series of horizontal scan lines, each line having a given number of pixels per inch. Station 29 will expose the photoconductive belt to successively record four latent colour separation images. The latent images are developed with magenta, cyan, yellow and black developer material, respectively. These developed images are transferred on the print sheet in superimposed registration with one another to form a multicolour image on the sheet. The ROS receives its input signal from IPS (image processing system) 31. This system is the electronic control device which prepares and manages the data inflow to scanner 30. A user interface UI, indicated by reference numeral 32, is in communication with the IPS and enables the operator to control the various operator-adjustable functions. IPS 31 receives its signal from input 34. This input can be the output of a RIS (raster input scanner) in case the apparatus is a so-called intelligent copier. In such case, the apparatus contains document illumination lamps, optics, a mechanical scanning drive, and a charge-coupled device. The RIS captures the entire original document and converts it to a series of raster scan lines and measures a set of primary colour densities, i.e. red, green and blue densities at each point of the original document. However, input 34 can as well receive an image signal resulting from an operator operating an image processing station.

After an electrostatic latent image has been recorded on photoconductive belt 26, belt 26 advances this image to the development station. This station includes four individual developer units 35, 36, 37 and 38.

The developer units are of a type generally referred to in the art as "magnetic brush development units". Typically, a magnetic brush development system employs a magnetizable developer material including magnetic carrier granules having toner particles adhering triboelectrically thereto. The developer material is continuously brought through a directional flux field to form a brush of developer material. The developer particles are continuously moving so as to provide the brush consistently with fresh developer material. Development is achieved by bringing the brush of developer material into contact with the photoconductive surface. Developer units 35, 36 and 37, respectively, apply toner particles of a specific colour which corresponds to the compliment of the specific colour-separated electrostatic latent image recorded on the photoconductive surface. The colour of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 10, while the green areas will be reduced to a voltage level ineffective for development. The charged areas are than made visible by having developer unit 35 apply green absorbing (magenta) toner particles onto the electrostatic latent image recorded on photoconductive belt 26. Similarly, a blue separation is developed by developer unit 36 with blue absorbing (yellow) toner particles, while the red separation is developed by developer unit 37 with red absorbing (cyan) toner particles. Developer unit 38 contains black toner particles and may be used to develop the electrostatic latent image formed from black information or text, or to supplement the colour developments. Each of the developer units is moved into and out of an operative position. In the operative position, the magnetic brush is closely adjacent to the photoconductive belt, whereas in the non-operative position, the magnetic brush is spaced therefrom. During development of each electrostatic latent image only one developer unit is in the operative position, the remaining developer units being in their non-operative one. This insures that each electrostatic latent image is developed with toner particles of the appropriate colour without intermingling. In FIG. 1, developer unit 35 has been shown in its operative position. Finally, each unit comprises a toner hopper, such as hopper 39 shown for unit 35, for supplying fresh toner to the developer which becomes progressively depleted by the development of the electrostatic charge images.

After their development, the toner images are moved to toner image transfer stations 40, 41, 42 and 43 where they are transferred on a sheet of support material, such as plain paper or a transparent film. At a transfer station, a sheet follows a rectilinear path 17 into contact with photoconductive belt 26. The sheet is advanced in synchronism with the movement of the belt. After transfer of the four toner images, the belt following an upward course is cleaned in a cleaning station 45 where a rotatable fibrous brush or the like is maintained in contact with the photoconductive belt 26 to remove residual toner particles remaining after the transfer operation. Thereafter, lamp 46 illuminates the belt to remove any residual charge remaining thereon prior to the start of the next cycle.

The operation of the printer described hereinbefore is as follows.

The magenta latent image being exposed by station 29 on photoconductive belt 26, this image is progressively developed by station 35 being in its operative position as the belt moves therethrough. Upon completion of the exposure of the magenta image, the yellow image becomes exposed. During the yellow exposure, the developed magenta image is transported past inactive stations 36, 37 and 38 while toner transfer stations 40 to 43 still are inoperative too.

As the development of the magenta latent image is finished, magenta development station 35 is withdrawn to its inoperative position and after the trailing edge of the magenta image has passed yellow development station 36, this station is put in the operative position to start the development of the yellow latent image. While the latter portion of the yellow latent image is being developed, the exposure of the cyan latent image at 29 starts already.

The described processes of imagewise exposure and colour development continue until the four colour separation images have been formed in successive spaced relationship on the photoconductive belt.

A sheet which has been taken from stack 12 and kept in readiness in aligner 16, is then advanced and reaches toner transfer station 40 where at that moment the last formed toner image, viz. the black one, is ready to enter the station. Thus, the lastly formed toner image is the first to become transferred to a sheet. The firstly formed toner image, viz. the magenta one, takes with its leading edge a position on the belt as indicated by the cross 62 and will thus be transferred last. The other two toner images take positions with their leading edges as indicated by crosses 63 and 64, respectively.

Thus, the timing of exposure of the four distinct images, the relative position of these images on the photoconductive belt and the lengths of the path of this belt between the successive transfer stations are such that as a paper sheet follows a linear path through these stations, the partly simultaneous transfer of the distinct toner images to the paper sheet is such that a perfect registering of these images is obtained.

The sheet bearing a colour toner image on its obverse side produced as described hereinbefore, is now passed through image forming station 21 for applying a colour toner image to the reverse side of the sheet.

The sheet electrostatically bearing the colour images is then received on the endless belt 24 of buffer station 23 before entering fuser station 25.

The length of buffer station 23 is sufficient for receiving the largest sheet size to be processed in the apparatus.

Fusing station 25 can be of known construction, comprising rubber rollers heated internally or externally by radiation or convection, and the fused sheet is finally received on platform 14.

More details about the described printer can be found in our co-pending application mentioned in the introduction of this specification. Idler rollers 27 that determine for photoconductive belt 26 an endless loop comprising a number of sub-loops as shown, must be carefully rotationally journalled in order to obtain a satisfactory belt path. They must also have a low rotational friction in order not to produce tension forces in the belt that would exceed desirable operational values.

Therefore, in accordance with the present invention, all or a number of these rollers are replaced by stationary air bearings.

Figures 2, 3:
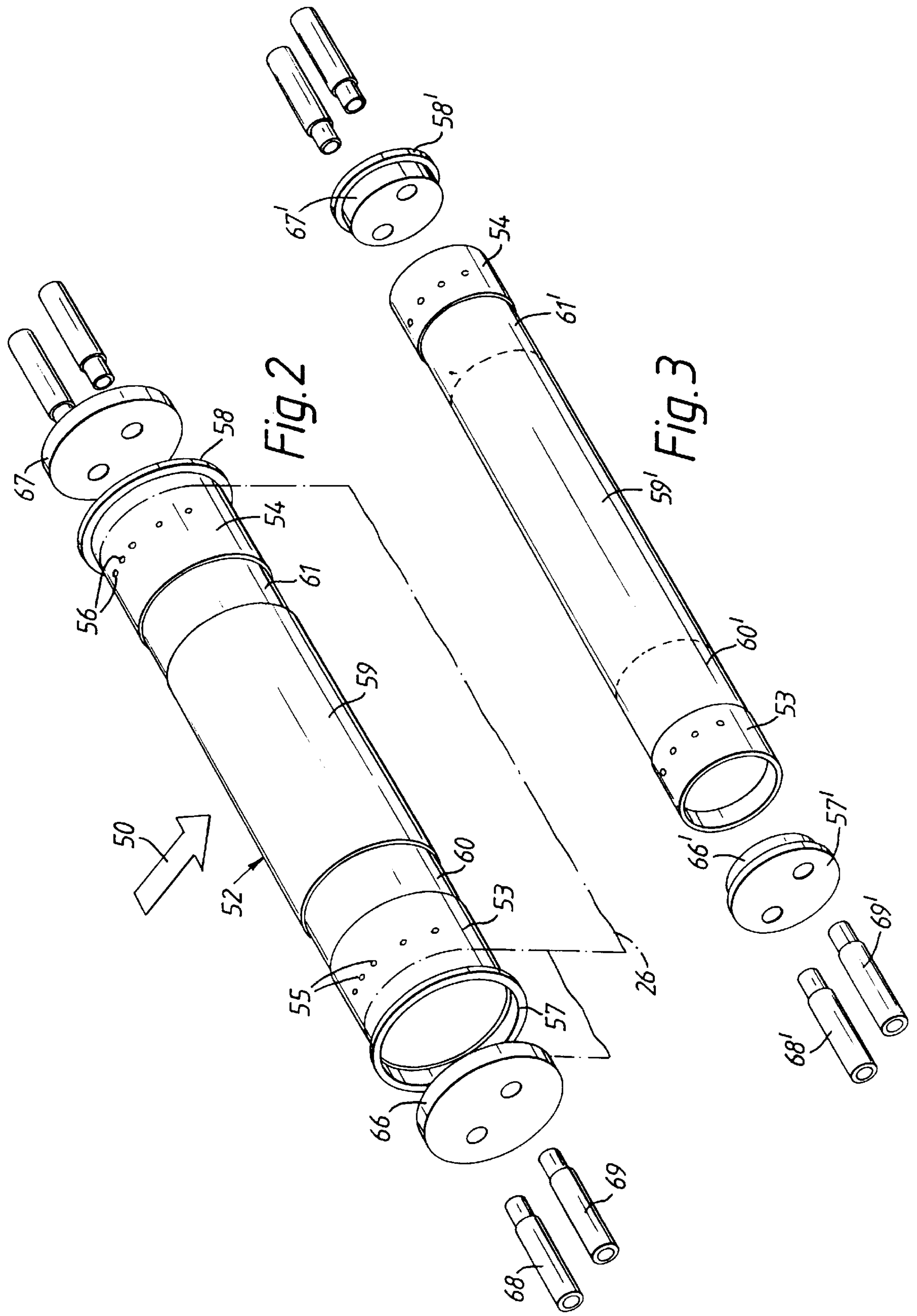

A first embodiment of a suitable air bearing is shown in FIG. 2. This bearing is arranged for supporting endless photoconductor belt 26 which it is angularly wrapped over approximately 180 degrees around the bearing. The belt may run over the bearing with its rearside facing inwardly, but the belt may also face the bearing with its photoconductive layer. This latter situation is notably the case for the bearings determining the sub-loops comprising the numerals 62, 63 and 64 in FIG. 1.

Referring to FIG. 2, an air bearing 50 is illustrated which is made from a relatively thick-walled plastic tube 52 which has been machined on a lathe to obtain two belt supporting end sections 53 and 54 with bores 55 and 56 arranged over an arc of 180 angular degrees, two collars 57 and 58 for limiting extreme transverse movement of the belt 26 shown in dash-and-dot lines, an intermediate section 59 without bores having a diameter equal to or smaller than that of sections 53 and 54, and two air cushion relief sections 60 and 61 having a diameter smaller than that of sections 53 and 54. Typically section 59 has a diameter that is 1 mm smaller than that of sections 53 and 54.

Two flanges 66 and 67 are glued in the corresponding ends of the bearing tube. They each are provided with two hose stems such as 68 and 69 shown for one flange. Feeding of pressurized air into the bearings occurs through the four stems simultaneously. The reason for providing two stems at each end is that they allow the mounting of the bearing in an accurate pre-determined angular position, what would be more difficult if central stems only were provided at each end.

In use of the bearing, the endless belt 26 remains spaced from belt-supporting sections 53 and 54 over a radial spacing which may range from 0 to 0.5 mm approximately. This spacing may be equal for section 59 if this section has a diameter equal to that of end sections 53 and 54, but suitably the central section has a diameter slightly smaller than that of the outer ones so that the belt is allowed to very slightly curve inwardly of the bearing before touching supporting section 59. Notable inward bending, e.g. at the start of the belt motion by the driving monumentum of a belt driving roller (pair) is, however, excluded since at that moment the belt will contact this section 59 whereby further flexing is prevented. Brief rubbing contact resulting therefrom will not necessarily damage the inside belt surface. On the contrary, excessive camber of the belt would cause transverse compression forces in the belt producing longitudinal folds or streaklike deformations of the belt, and this of the outside as well as of the inside belt surface rendering the belt unsuited for further use.

In the operation of the air bearing, it has been shown that the air-pressure relief sections 60 and 61 have a stabilising effect in that allow the easy outflow of air from the belt supporting system.

FIG. 3 shows another embodiment of an air bearing for use in a printer according to the invention. The bearing is similar to that of FIG. 2, except for the air-pressure relief sections near the belt supporting end sections, which are not provided as separate elements in the present embodiment. Thus, intermediate belt supporting section 59' now covers the complete distance between end sections 53 and 54. The air-pressure relief sections are integral with intermediate section 59' which in this case has a diameter slightly smaller than that of end sections 53 and 54. Thus, zones 60' and 61' of intermediate section 59', indicated by the dashed lines, now function as the pressure relief sections adjacent to belt bearing sections 53 and 54. The construction of the present bearing thereby is simpler than that of the FIG. 2 bearing, and it has been shown that in a number of cases (e.g. with a bearing diameter larger than or equal to 70 mm) its operation is equivalent to that of this first bearing embodiment. Also the construction of the end walls 66' and 67', and of rims 57' and 58', is simpler than in the foregoing embodiment.

FIGS. 4 to 8 show still another embodiment of an air bearing for a printer according to the invention.

Figure 4:
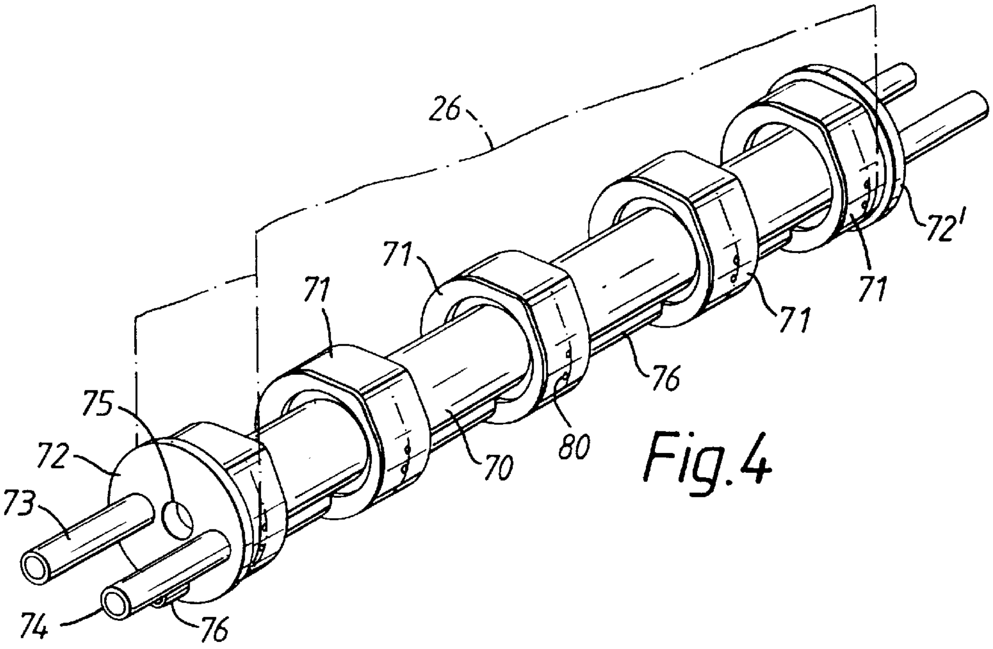

The air bearing shown in FIG. 4 comprises basically a primary feed pipe 70 bearing a plurality of axially spaced belt bearing sections 71. The two outermost sections are provided with flanges such as 72 and 72' for limiting excessive transverse motion of a belt. Connection of feed pipe 70 to an air pressure supply occurs via four stems, see e.g. 73 and 74. A central bore 75 in flange 72 serves for connecting an air-pressure measuring device.

The air bearing comprises also a secondary air pressure feed pipe 76 which allows to establish over a limited angular area of the bearing a belt-supporting air cushion which has an air pressure differing from that of the central feeding.

Figure 5:
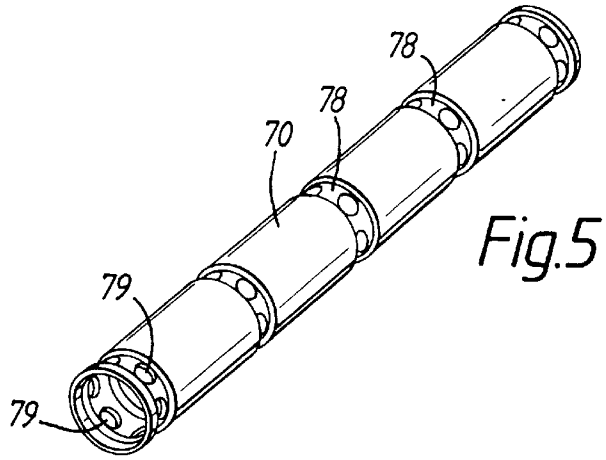

FIG. 5 is an isometric view of primary feed pipe 70. This pipe is a cylindrical tube provided with axially spaced annular grooves 78 having each a series of angularly spaced radial bores 79.

Figure 6:
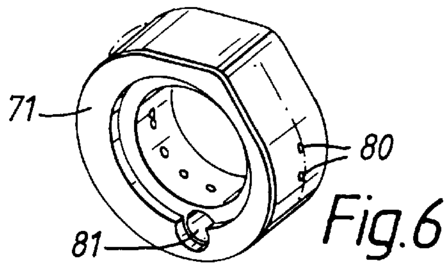

FIG. 6 is an isometric view of one bearing section 71. This section is in fact a nearly ringlike member which is provided with a row of radial bores 80 extending through the wall of the bearing over an area of about 180 degrees, and one axial bore 81 which is in communication with one radial bore 80.

Figure 7:
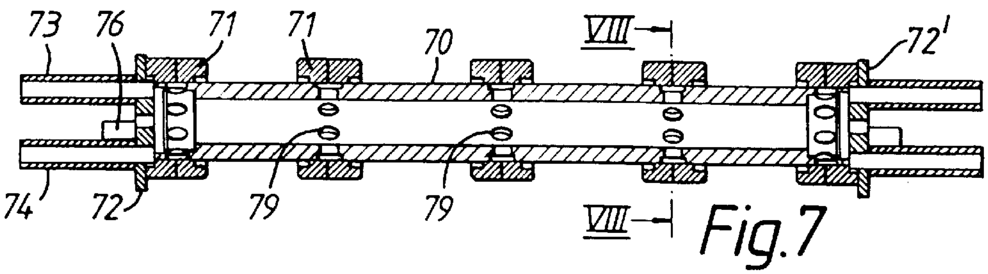

FIG. 7 is a diagrammatic longitudinal sectional view of the bearing of FIG. 4. Bearing sections 71 closely fit on primary feed pipe 70 and their radial bores are in communication with the interior of this pipe by their coinciding with corresponding grooves 78 of this pipe. Sections 71 may be glued to, or in another way fixedly be attached to the pipe. Secondary feed pipe 76 extends through the corresponding bores 81 of sections 71 and is via a number of small bores in connection with the axial bore 81 of the sections 71. The bores of secondary feed pipe 76 are spaced axially as well as angularly. Feed pipe 76 rotatably fits in bores 81 so that rotation of this pipe allows to establish different working conditions which will now be described with reference to FIGS. 8*a* to 8*c* which are enlarged cross sections on line VIII—VIII of FIG. 7. These cross-sections show that the connection of a section 71 with pipe 76 occurs in fact via three bores in the wall of this pipe. The bores lie in the same plane and are angularly spaced over 90 degrees, and act in some way as a three-way valve.

Figure 8A:
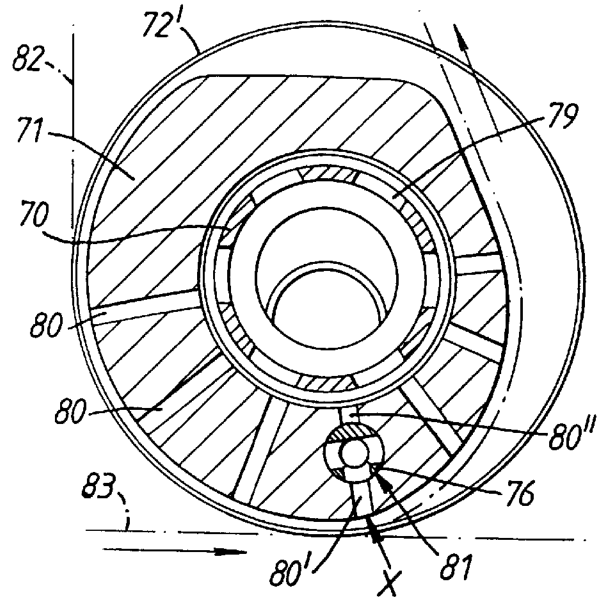

Referring to FIG. 8*a*, the valve is in its downward position so that pipe 76 is in connection with the outward end 80' of the corresponding bore 80 of belt-supporting sections 71. The inward end 80", on the contrary, of this bore is closed by the corresponding wall section of pipe 76.

In this way it is possible, and even preferable, for the air pressure to be adjusted in such a way that the belt bearing pressure at bore end 80' is higher than the air pressure at all the other bores 80. The reason for this differential pressure is as follows.

FIG. 8*a* reveals that the curvature of member 71 is not uniform over the belt-supporting stretch but, on the contrary, has a local area of greater curvature at the position indicated by arrow 'X', which position coincides practically with that of bore end 80'. The reason for this increased curvature is to create a larger angle of separation between the photoconductive belt 26 following a path indicated by dash-and-dot line 82, and the paper support following a tangential, straight path 83. However, the locally increased curvature of the endless belt asks for an increased air supporting pressure in order to avoid undesired contact of the belt with the bearing. The described arrangement allows to set such higher air pressure.

Figure 8B:
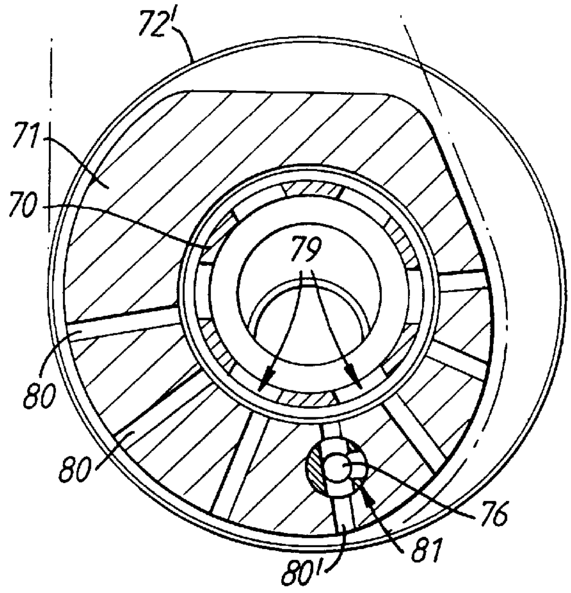
Figure 8C:
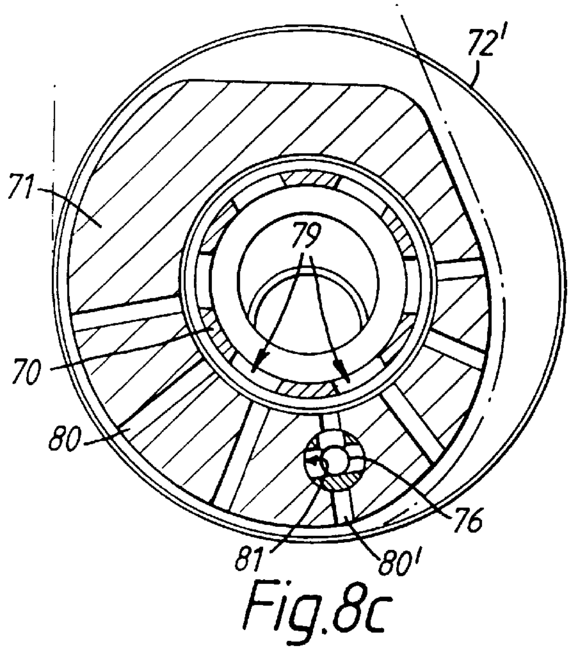

Rotation of pipe 76 in the corresponding bores 81 of the distinct bearing sections allows to put bore ends 80' in straight communication with pipe 70, see FIG. 8*b*, or to completely close such bore ends, see FIG. 8*c*.

Appropriate angular adjustment of this tube allows to obtain any intermediate setting for obtaining any desired ratio between both air pressures.

It will be clear that a bearing of a type as described in FIGS. 4 to 8 is not limited to one secondary air-pressure feed pipe only, and thus two or even more of suchlike pipes may be provided, in communication with corresponding radial bores, for optimum support of the photoconduction belt, allowing to set a desired air-pressure pattern, considered angularly of the bearing.

Finally, the air bearing may be arranged in such a way that the air pressure also varies along the length of the bearing, i.e. widthwise of the belt, to produce centrally of the belt a supporting air cushion which differs from that near the margins of the belt.

What is claimed is:

1. Electrostatographic printing apparatus comprising:

a recording member in the form of an endless belt, and at least one air bearing for guiding said belt along an endless path, said air bearing including two belt-supporting end sections with a certain circumferential size, arranged for producing supporting air cushions for supporting both marginal portions of the endless belt while the belt is angularly wrapped about them, an intermediate section located between such end sections for providing support for the belt if a central portion thereof would tend to become displaced exaggeratedly inwardly of the bearing, while yet remaining free of contact with the belt in normal operation of the bearing, and two air cushion relief sections, each one located inwardly adjacent to a corresponding end section of the bearing, and having a circumferential size which is smaller than that of said end sections.

2. Electrostatographic printing apparatus according to claim 1, wherein said intermediate section has a uniform axial cross section and a length which is at least equal to one third the length of said air bearing.

3. Electrostatographic printing apparatus according to to claim 2, wherein said air cushion producing air bearing sections have a cylindrically curved belt-supporting surface.

4. Electrostatographic printing apparatus according to claim 2, which is arranged for transferring a toner image from said endless belt onto a receptor support at a locus where said endless belt is supported by said air bearing, such receptor support following a linear path at such locus, and wherein said air bearing has a cross section the curvature of which is smaller at the place where such receptor support leaves contact with the endless belt than upstream of such place.

5. Electrostatographic printing apparatus according to claim 1, wherein said intermediate section comprises a plurality of axially spaced belt-supporting sections.

6. Electrostatographic printing apparatus according to claim 5, wherein said intermediate belt-supporting sections are arranged to produce belt-supporting air cushions.

7. Electrostatographic printing apparatus according to to claim 6, wherein said air cushion producing air bearing sections have a cylindrically curved belt-supporting surface.

8. Electrostatographic printing apparatus according to claim 6, which is arranged for transferring a toner image from said endless belt onto a receptor support at a locus where said endless belt is supported by said air bearing, such receptor support following a linear path at such locus, and wherein said air bearing has a cross section the curvature of which is smaller at the place where such receptor support leaves contact with the endless belt than upstream of such place.

9. Electrostatic printing apparatus according to claim 1, which comprises means for forming in succession a plurality of toner images on the surface of said endless belt, and wherein said air bearings are arranged for guiding such belt along sub-loops that bring portions of said belt in mutually closely spaced relationship in contact with a receptor support which follows a linear path, to transfer said successive toner images in coinciding relationship on said receptor support.

10. Electrostatic printing apparatus according to claim 9, which comprises means for forming in succession a plurality of toner images on the surface of said endless belt, wherein said plurality of toner images are colour separation toner images.

11. Electrostatic printing apparatus according to claim 10, wherein said recording member is a photoconductive belt.

* * * * *